United States Patent [19]

Bergman

[11] Patent Number: 4,710,369

[45] Date of Patent: Dec. 1, 1987

[54] OXIDATION METHOD FOR PRODUCTION OF SPECIAL ALUMINAS FROM PURE ALUMINUM CHLORIDE

[75] Inventor: Lee H. Bergman, Baton Rouge, La.

[73] Assignee: Toth Aluminum Corporation, Metairie, La.

[21] Appl. No.: 872,600

[22] Filed: Jun. 10, 1986

[51] Int. Cl.[4] ............................................. C01F 7/02
[52] U.S. Cl. .................................. 423/625; 423/111;
423/500; 75/68 R
[58] Field of Search ............... 423/111, 625, 500, 631;
75/68 R

[56] References Cited

U.S. PATENT DOCUMENTS

| | | | |
|---|---|---|---|
| 2,780,525 | 2/1957 | Wendell et al. ..................... | 423/625 |
| 2,823,982 | 2/1958 | Saladin et al. ...................... | 423/625 |
| 3,235,332 | 2/1966 | Woodhall ............................ | 423/625 |
| 3,264,124 | 8/1966 | Lauder et al. ...................... | 423/631 |
| 4,120,941 | 10/1978 | Nowak et al. ..................... | 423/625 |
| 4,276,274 | 6/1981 | Heckel ............................... | 423/625 |
| 4,465,659 | 8/1984 | Cambridge et al. ................ | 423/495 |

*Primary Examiner*—Patrick P. Garvin, Sr.
*Assistant Examiner*—Paige C. Harvey
*Attorney, Agent, or Firm*—George A. Bode

[57] ABSTRACT

A process for producing alumina involving reacting anhydrous aluminum chloride with a oxidizing agent with a temperature within the range of from about 700° C. to about 1200° C. to form aluminum oxide and chlorine and separating the chlorine and mixing a portion thereof with the reacting aluminum chloride and oxidizing agent.

20 Claims, No Drawings

4,710,369

OXIDATION METHOD FOR PRODUCTION OF SPECIAL ALUMINAS FROM PURE ALUMINUM CHLORIDE

BACKGROUND OF THE INVENTION

Non-metallurgical grades of alumina have in recent years attained considerable importance as commercial items. These materials have found application in rapidly expanding industries as, for instance, refractory brick, anti-skid surfacing, high-strength porcelain, abrasives, cement catalysts, fire-retardants, high voltage and spark plug insulators, electronics, vacuum tube envelopes, the lighting industry etc.

This invention relates to the production of alumina and, more particularly, to the production of a novel form of alumina having desirable properties rendering it eminently satisfactory for use in producing high alumina, low soda ceramic products and other things.

Currently, synthetic alumina is generally produced from the calcination of aluminum trihydrate which has been derived from bauxite. The product obtained usually contains considerable proportions of soda. The presence of soda is a disadvantage; for example, high electrical insulators prepared from these calcined aluminas have a tendency to lessen their electrical resistance, and it also has an interaction with catalytic castings. Further processing is necessary to reduce the soda content of the alumina. This is just but one of the causes of the uneconomical burden placed on the specialty alumina industry.

Due to their rapid rise in price, the demand for high grade ores, on which many current chemical industries are based, is fast disappearing. The alumina industries are illustrative of such a situation wherein the USA depends on foreign sources for more than 90% of its high grade bauxite. Toth Aluminum Corporation (a U.S. Corporation) has made major thrusts towards the development of economically feasible processes which utilize abundant low-grade ores.

The chlorination of kaolinitic clay, a low grade ore containing in its raw state up to 21% of aluminum metal values, produces a crude aluminum chloride, that after purification, offers a potentially economically feasible means from which specialty aluminas can be obtained via an unique oxidation process.

The instant invention is primarily concerned with the oxidation of high-purity aluminum chloride to make high purity aluminum oxides. More specifically, aluminum oxide of the purity needed to compete in the rapid development of the technologies in the electronic, telecommunication, instrument, lighting, chemical and mechanical industries.

DISCUSSION OF PRIOR ART

Processes for the conversion of various metallic chlorides into metallic oxides, by what is known as oxidation, are old and well known in the art. There have been successful efforts to oxidize metallic chlorides such as silicon tetrachloride and titanium tetrachloride, and various patents have issued thereon. The oxidation products obtained from these processes are primarily used in pigments, paper, thixotropic agents, etc. They find no place in the industries in which this invention is concerned with.

The literature shows attempts to oxidize aluminum chloride with oxidizing agents to produce high purity aluminum oxide without economical success. Unfortunately, a problem associated with the production of high-purity aluminum oxide has been the selection of the starting material. This has necessitated the use of aluminum chlorhydrates and the decomposition therefrom. Another problem has been the complete conversion of aluminum aluminum chloride to aluminum oxide causing the total process to a satisfactory grade of alumina to be time consuming and uneconomical, as shown in U.S. Pat. No. 3,264,124. This prior art has apparently never been used commercially, presumably because it appears to be inoperative according to actual laboratory tests, and even, if workable, such processes would require heavy capital and production costs.

In accordance with the present invention, however, this problem has been substantially solved.

SUMMARY OF THE INVENTION

A primary objective of the present invention is to provide processes for producing aluminas, especially kappa alumina, having a proper quality, namely, ultrafine particle size, low soda content, and high reactivity as compared with heretofore known ceramic grade alpha aluminas.

A principal objective of the present invention is to produce specialty aluminum oxides at a greater reaction rate and/or yield by the controlled oxidation of ultra pure aluminum chlorides.

Another principal objective of the present invention is to produce speciality aluminum oxides at a greater reaction rate and/or yield by controlled oxidation of ultra pure aluminum chloride and by cooling and/or diluting the reaction mass with chlorine gas.

Yet another principal objective of the present invention is to produce specialty aluminum oxides at a greater reaction rate and/or yield by the controlled oxidation of ultra pure aluminum chloride, by cooling and/or diluting the reaction mass with chlorine gas, and by controlled feeding of the aluminum chloride in the vapor state. A uniform aluminum oxide is obtained with any-/or all impurities being homogeneous.

Among the many advantages and features of the present process is the provision, for the first time, of a commercially feasible process involving the conversion of aluminum chloride into aluminum oxides, especially kappa alumina, at reaction rates and yields heretofore unrealized in the prior art. The kappa alumina produced pursuant to the present process can be subsequently converted to alpha alumina; and the kappa and/or the alpha aluminas, thereafter, used for the production of ceramic products and other things.

The above objectives, together with other distinguishing features and advantages of the instant invention, will be apparent to one skilled in the art in light of the ensuing disclosure of its preferred embodiments and which are also distinctly claimed hereafter.

DESCRIPTION OF THE PREFERRED EMBODIMENT(S)

The novel process of the instant invention involves the controlled oxidation of anhydrous ultra pure aluminum chloride, preferably pure anhydrous aluminum chloride as produced in U.S. Pat. No. 4,514,373, U.S. Ser. Nos. 691,958, 691,959, and 691,960; however any aluminum chloride used can be any acceptable high purity aluminum chloride of commerce; for example, it can be produced, with or without further purification, by distillation, sublimation, eutectic salt melts, chlorinating pure aluminum metal or alumina, or by by any other methods. The term anhydrous is defined as an inorganic compound that does not contain water either adsorped on its surfaces or combined as water of crystallization. The aluminum chloride in the vapor phase is reacted with an oxygenating agent, preferably oxygen gas, at a temperature within the range of about 700° C. to 1200° C., preferably 900° C. to 1100° C., employing at least the stoichiometric amount of oxygen to convert the aluminum chloride to aluminum oxide. As an example of oxidation, the oxidation of anhydrous aluminum chloride is given by the following:

$$2AlCl_3 + 3/2O_2 \rightarrow Al_2O_3 + 3Cl_2$$

As the above reaction is written, the free energy is about $-70$ Kcal, and thus, the reaction could be expected to proceed as written. The kinetics, or rate of the reaction, can only be determined experimentally, and, in spite of the highly favorable free energy, it has been found that the reaction is slow and does not proceed to completion. Although the literature teaches an excess of from 20% to 50% oxygenating agent over and above the stoichiometric amount shown above to complete the reaction, pursuant to the discovery of the present invention, it has been found, that although excess oxygen may be employed, completion of the reaction is greatly influenced by time and temperature.

Also, at the stage of feeding the aluminum chloride and oxygen to the reaction zone, pursuant to the present invention, it is preferred to recycle part of the chlorine gas after cooling to the reaction zone. The other part of the chlorine gas, purged from the system, may be purified and sold as such or recycled to a chlorination unit wherein metallic chlorides are produced. Addition of the chlorine gas to the oxidation zone maintains proper reaction temperature and reduces fouling on the reaction chamber walls.

The most salient feature of the present invention is the fact that the inclusion of the chlorine gas with the aluminum chloride and oxygen provides for the production of aluminas, especially kappa alumina, with the necessary properties for use in ceramics other things.

Another salient feature of the present invention is that, when the above conditions are met, high yields of aluminum oxide are realized in extremely short periods of time. Conversion of aluminum oxide was negligible at 600° C. to 700° C. temperatures, however at 900° C. to 1100° C., 95% to nearly 100% conversion was obtained within 5 seconds.

The improved process of the present invention can be carried out pursuant to various well known chemical processing techniques utilizing conventional types of reaction equipment. Accordingly, different types of apparatus that can be employed are shallow bed reactors, shaft reactors, fluid and static bed reactors, rotary reactors, plasma reactor, burner reactors or the like. Of course, the type of process equipment selected will invariably in turn affect the determination of various process parameters. In accordance with this invention, a burner type reactor was selected for the reaction equipment. The use of comparitively low temperatures and short reaction zones and times minimizes the initial capital cost of process equipment as well as the cost of subsequent operation and maintenance. The highly consistent residence time for the reactants in this production apparatus assures a uniform particle size and minimal phase transformation to alpha alumina.

Another salient feature of the present invention is the fact that it an be carried out at essentially atmospheric pressure which represents a preferred embodiment of the present invention. Pressures ranging from about $\frac{1}{2}$ atmosphere to about 15 atmospheres, preferably from about 1 atmosphere to about 10 atmospheres, are used depending upon the production scale and/or selected chlorine recovery scheme. These and other elegant advantages and features of the present invention will come to light as the discussion proceeds.

The prior art taught that the oxidation of aluminum chloride produced amorphous aluminas or mixtures of the phases of alumina. So it is very significant that the present invention teaches reactants usage and chlorine gas recyclement to process a form of alumina known as kappa which function entirely free of any of the teachings of the prior art. Only a novel and unexpected reaction could occur in the present invention, completely divorced from the prior art.

The anhydrous aluminum chloride vapors being introduced into the reaction zone are produced by carefully subliming the solid aluminum chloride and monitoring the same compound by heating it to at least 182° C. The impurities contained in the aluminum chloride solid are equally distributed throughout the vaporous aluminum chloride, and all are then easily converted to their respective oxides and are distributed evenly throughout the aluminum oxide. In certain cases, the use of dopants are introduced with the aluminum chloride vapor as their respective chlorides. To demonstrate the process of this invention, the following working examples are presented using high purity aluminum chloride.

In accordance with this present invention regarding the effects of different variables, a bench scale burner with an outer burning space was constructed, operated and perfected. The effects of temperature, residence time, oxygen excess, and chlorine gas addition on the process were investigated.

The aluminum chloride used was the product obtained from the Toth Aluminum Corporation process. The AlCl$_3$ was sublimed by heating the solid AlCl$_3$ in a system sealed off to the atmosphere at about 200° C. The vapors were fed to the reactor zone via a permanently heated pipe line and a source for measuring the flow. The pure oxygen and chlorine were obtained from local sources and their flow to the reaction zone was monitored via oxygen and chlorine flow meters respectively. The burner was enclosed in a quartz tube, and the annular space was heated by a heater connected to the tube. Thermocouples connected to a potentiometer were used in all cases to measure temperatures of the reaction zone and system. The alumina product was collected in a cooled chamber, and dust bags were used to collect the fine alumina dust. The path of the burner which could be varied was measured, and the volume of the flame path was obtained. The residence time was calculated from the space velocity of gases passing through the flame. Conversion was calculated by the ratio of the mass of the alumina product obtained to the mass of AlCl$_3$ feed expressed as Al$_2$O$_3$. The stoichiometry of the reaction is shown below:

$$2AlCl_3 + 3/2O_2 \longrightarrow Al_2O_3 + 3Cl_2$$

| 2 mols | 1½ mols | 1 mol | 3 mols |
|--------|---------|-------|--------|
| 267    | 48      | 102   | 213    |

Analyses of the feedstock and products were carried out in accordance with conventional analytical procedures using up-to-date analytical laboratory equipment.

The following examples and tables are given to illustrate the preferred embodiments of the invention with the understanding that the invention is not limited to these examples.

TABLE 1

CONVERSION AS A FUNCTION OF REACTION TEMPERATURE RESIDENCE TIME AT 1000° C.: 4.5 secs.

| TEMP. °C. | $AlCl_3$ FEED mg | $Al_2O_3$ PRODUCT OBTAINED mg | CONVERSION $AlCl_3 \rightarrow Al_2O_3$ % |
|---|---|---|---|
| 600 | 1704 | 11 | 1.7 |
| 700 | 1851 | 130 | 18.4 |
| 800 | 1956 | 219 | 29.3 |
| 900 | 1529 | 360 | 61.5 |
| 1000 | 1500 | 371 | 64.6 |
| 1050 | 1667 | 425 | 66.6 |
| 1150[1] | 1803 | 469 | 68.0 |

[1]Shown as example 1 Table 6

TABLE 2

CONVERSION AS A FUNCTION OF REACTION TEMPERATURE RESIDENCE TIME AT 1000° C.: 19.5 secs.

| TEMP °C. | $AlCl_3$ FEED mg | $Al_2O_3$ PRODUCT OBTAINED mg | CONVERSION $AlCl_3 \rightarrow Al_2O_3$ % |
|---|---|---|---|
| 600 | 1782 | 33 | 4.8 |
| 700 | 1693 | 178 | 27.6 |
| 800 | 1733 | 253 | 38.2 |
| 900 | 1705 | 400 | 62.7 |
| 1000 | 1588 | 405 | 66.6 |
| 1050 | 2094 | 700 | 87.4 |
| 1100 | 1997 | 700 | 91.6 |
| 1150 | 1997 | 730 | 95.5 |
| 1150[2] | 1607 | 610 | 99.2 |

[2]Shown as example 2 Table 6

TABLE 3

CONVERSION AS A FUNCTION OF OXYGEN EXCESS RESIDENCE TIME AT 1000° C.: 4.5 secs.

| TEMP. °C. | $AlCl_3$ FEED mg | OXYGEN EXCESS % | $Al_2O_3$ PRODUCT OBTAINED mg | CONVERSION $AlCl_3 \rightarrow Al_2O_3$ % |
|---|---|---|---|---|
| 1150* | 1803 | 47 | 469 | 68.0 |
| 1150[3] | 1796 | 55 | 460 | 67.1 |
| 1150 | 1822 | 78 | 482 | 69.3 |
| 1150 | 1687 | 115 | 440 | 68.2 |

*Oxygen rate was adjusted for zero excess however the conversion altered the oxygen stoichiometry.
[3]Shown as example 3 Table 6.

TABLE 4

CONVERSION AS A FUNCTION OF CHLORINE RECYCLE RESIDENCE TIME AT 1000° C.: 4.5 secs.

| TEMP. °C. | $AlCl_3$ FEED mg | CHLORINE RECYCLE* % | $Al_2O_3$ PRODUCT OBTAINED mg | CONVERSION $AlCl_3 \rightarrow Al_2O_3$ % |
|---|---|---|---|---|
| 900 | 1980 | 47.4 | 638 | 84.3 |
| 1000 | 1887 | 43.4 | 664 | 92.1 |
| 1050 | 1888 | 43.2 | 668 | 92.6 |
| 1150[4] | 1920 | 41.0 | 715 | 97.5 |

*Chlorine recycle was adjusted to obtain 40% of the $AlCl_3$ feed however the conversion dictated the actual percentage.
[4]Shown as example 3 Table 6

TABLE 5

CONVERSION AS A FUNCTION OF CHLORINE RECYCLE RESIDENCE TIME AT 1000° C.: 4.5 secs.

| TEMP. °C. | $AlCl_3$ FEED mg | CHLORINE RECYCLE* % | $Al_2O_3$ PRODUCT OBTAINED mg | CONVERSION $AlCl_3 \rightarrow Al_2O_3$ % |
|---|---|---|---|---|
| 1150 | 1803 | 0 | 469 | 68.0 |
| 1150 | 1883 | 10.3 | 696 | 96.8 |
| 1150 | 1920 | 41 | 715 | 97.5 |
| 1150[5] | 1886 | 103 | 699 | 97.0 |

[5]Shown as example 5 Table 6

TABLE 6

EFFECT OF THE FUNCTIONS ON THE PROPERTIES OF THE ALUMINA PRODUCT OBTAINED

| EXAMPLE | CONVERSION % | ALUMINA PHASE | SPECIFIC SURFACE AREA RANGE m²/g | GRAINSIZE AVERAGE μm | REAL DENSITY RANGE g/cm³ |
|---|---|---|---|---|---|
| 1 | 68.0 | 90+ % kappa | 6–7 | <2 | 3.5 to 3.98 |
| 2 | 99.2 | kappa | 4–5 | <2 | 3.5 to 3.98 |
| 3 | 67.1 | 90+ % kappa | 6–7 | <2 | 3.5 to 3.98 |
| 4 | 97.5 | 90+ % kappa | 2–3 | <2 | 3.5 to 3.98 |
| 5 | 97.0 | kappa | 2–3 | <2 | 3.5 to 3.98 |

TABLE 7

EFFECT OF HEAT TREATMENT ON THE EXAMPLES SHOWN IN TABLE 6

| EXAMPLE | TEMP. °C. | RESIDENCE TIME HRS | MINERALOGICAL PHASE |
|---|---|---|---|
| 5 | 350 | 2 | kappa |
| 5 | 1000 | 3 | kappa + trace alpha |
| 5 | 1100 | 3 | alpha |
| 5 | 1150 | 3 | alpha |
| 5 | 1200 | 3 | alpha |
| 5 | 1300 | 3 | alpha |

As a result of the experiments shown in the tables, the following conclusions have been drawn on the effects of temperature, residence time, oxygen excess, and chlorine gas addition on the process Without chlorine gas addition, conversion of $AlCl_3$ to $Al_2O_3$ is below 10% at 600° C. and approaches 90% at 1,150° C. Conversion is essentially complete once 1150° C. has been obtained. The reaction without $Cl_2$ addition is dependent on residence time and temperature.

The effect of modest oxygen excess is not as great on conversion as are temperature and residence time.

The largest effect by far is the chlorine gas addition to the process. It is extremely gratifying to note that chlorine gas addition from about 10% to about 100% on the $AlCl_3$ feed not only increases the conversion but also greatly enhances the rate of reaction as shown by the low 4.5 secs. residence time.

In commercial operation in which the system would be an adiabatic condition, the recycled chlorine gas with the oxygen would have a further effect by moderating the heat of the reaction.

Although the reactions shown have been carried out at essentially atmospheric pressure, increased pressure will have little effect on conversion but would greatly improve the economics to recover the chlorine.

Another greatly satisfying point to consider is that the variables shown in tables 1 to 5 have very little or no effect on the properties of the alumina produced as shown in table 6.

The kappa-$Al_2O_3$ produced under the above conditions can be completely transformed into alpha-$Al_2O_3$ within 3 hours at 1100° C.

The present process(es) offer as a distinguishing feature the utilization of relatively short reaction times, a feedstock containing relatively low amounts of soda, and a product not sensitive to variables. The benefit of such short reaction times, coupled with significant yields realized hereby and doping insitu in the burner or downstream, renders the present process commercially attractive and introduces to the art a whole new area of commercially adaptable chemistry for the production of aluminum oxide from aluminum chloride found in ordinary clay.

It will be apparent to one skilled in the art that various changes and modifications can be made within the ambit of the present invention without departing from its true scope and spirit. For example, such parameters as its adaption to a continuous operation, the type of reaction equipment employed, the method of mixing the reactants, and the like can vary. Accordingly, while what is described is what is believed to be the best embodiments of the invention, however, it is not wished to be confined within those embodiments and the examples which are only illustrative of the invention, and what is desired to cover by Letter Patent is as set forth in the appended claims.

I claim:

1. A process for producing alumina from anhydrous aluminum chloride which comprises reacting said anhydrous aluminum chloride with an oxidizing agent having a temperature within the range of from about 700° C. to less than 1,150° C. while introducing chlorine in the presence of said aluminum chloride and oxidizing agent, thereby increasing the yield of said alumina produced from said aluminum chloride and oxidizing agent.

2. The process of claim 1, further comprising the step of separating said chlorine from the products formed from reacting said aluminum chloride with said oxidizing agent.

3. The process of claim 2, wherein said step of introducing chlorine in the presence of said aluminum chloride and oxidizing agent includes mixing a portion of said separated chlorine with said reacting aluminum chloride and said oxidizing agent, thereby increasing the yield of said alumina.

4. The process of claim 1, wherein the oxidizing agent is oxygen.

5. A process for producing alumina from anhydrous aluminum chloride comprising:
   a. reacting aluminum chloride with an oxidizing agent having a temperature within the range of from about 700° C. to less than 1,150° C. to form aluminum oxide and chlorine;
   b. separating said chlorine from the aluminum oxide-chlorine mixture; and,
   c. mixing a portion of said separated chlorine with said reacting aluminum chloride and oxidizing agent, thereby increasing the yield of aluminum oxide formed from said reacting aluminum chloride and oxidizing agent.

6. The process of claim 5, wherein said aluminum chloride is anhydrous.

7. The process of claim 5, wherein said oxidizing agent is oxygen.

8. The process of claim 5, wherein said temperature is within the range of from about 900° C. to about 1100° C.

9. The process of claim 5, wherein said reacting of said aluminum chloride and oxidizing agent is with a pressure within the range from about 0.5 atmosphere to about 15 atmospheres.

10. A process for producing alumina involving oxidation of anhydrous aluminum chloride comprising the steps of:
    a. reacting anhydrous aluminum chloride with an oxidizing agent having a temperature within the range of from about 700° C. to less than 1,150° C. to form aluminum oxide and chlorine;
    b. separating said chlorine from said mixture of aluminum oxide and chlorine; and,
    c. mixing a portion of said separated chlorine with said reacting aluminum chloride and oxidizing agent, thereby increasing the yield of said aluminum oxide formed from said reacting aluminum chloride and oxidizing agent.

11. The process of claim 10, wherein said oxidizing agent is oxygen gas.

12. The process of claim 10, wherein reacting of said aluminum chloride and said oxidizing agent is with a pressure within the range of from about 0.5 atmosphere to about 15 atmospheres.

13. The process of claim 10, wherein said chlorine is a gas, cooled after separation from said mixture of aluminum oxide and chlorine and before mixing of a portion thereof with said aluminum chloride and oxidizing agent.

14. A process for producing alumina involving oxidation of anhydrous aluminum chloride comprising the steps of:
    a. heating said aluminum chloride to a temperature of at least 180° C., thereby producing vaporous aluminum chloride;
    b. reacting said vaporized aluminum chloride gas and an oxidizing agent having a temperature within the range of from about 700° C. to less than 1,150° C. and at a pressure within the range of from about 0.5 atmosphere to about 15 atmospheres, to form crystalline aluminum oxide and chlorine gas;
    c. separating said chlorine gas from said mixture of aluminum oxide and chlorine gas; and,
    d. mixing a portion of said separated chlorine gas with said reacting vaporized aluminum chloride and oxidizing agent, thereby increasing the yield of said aluminum oxide formed from said reacting aluminum chloride and oxidizing agent.

15. The process of claim 14, wherein said oxidizing agent is oxygen.

16. The process of claim 14, involving the step of cooling said separated chlorine gas after separation from said mixture of aluminum oxide and chlorine gas and before mixing a poriton thereof with said reacting aluminum chloride and oxidizing agent.

17. The process of claim 14, wherein said aluminum chloride and oxidizing agent are maintained in said temperature range for a time period of from about 4.5 to about 20 seconds.

18. The process of claim 1, wherein the step of introducing chlorine in the presence of said aluminum chloride and oxidizing agent increases the rate of said reacting.

19. The process of claim 5, wherein said mixing said separated chlorine with reacting aluminum chloride and oxidizing agent increases the rate of said reacting.

20. The process of claim 14, wherein said mixing said separated chlorine with reacting aluminum chloride and oxidizing agent increases the rate of said reacting.

* * * * *